United States Patent
Page et al.

(10) Patent No.: US 8,991,751 B2
(45) Date of Patent: Mar. 31, 2015

(54) LONG ENDURANCE VERTICAL TAKEOFF AND LANDING AIRCRAFT

(75) Inventors: Mark Allan Page, Cypress, CA (US); Matthew Robert McCue, Irvine, CA (US); Robert Anthony Godlasky, Yorba Linda, CA (US)

(73) Assignee: DZYNE Technologies, Inc., Irvine, CA (US)

( * ) Notice: Subject to any disclaimer, the term of this patent is extended or adjusted under 35 U.S.C. 154(b) by 261 days.

(21) Appl. No.: 13/429,156

(22) Filed: Mar. 23, 2012

(65) Prior Publication Data

US 2012/0248259 A1 Oct. 4, 2012

Related U.S. Application Data

(60) Provisional application No. 61/465,760, filed on Mar. 24, 2011.

(51) Int. Cl.
*B64C 29/02* (2006.01)
*B64C 39/02* (2006.01)

(52) U.S. Cl.
CPC .............. *B64C 29/02* (2013.01); *B64C 39/024* (2013.01); *B64C 2201/165* (2013.01); *B64C 2201/108* (2013.01); *B64C 2201/088* (2013.01); *B64C 2201/104* (2013.01); *B64C 2201/162* (2013.01)
USPC .................................. 244/78; 244/39; 244/56

(58) Field of Classification Search
USPC .............. 244/7 R, 7 A, 7 B, 7 C, 12.4, 39, 56
See application file for complete search history.

(56) References Cited

U.S. PATENT DOCUMENTS

| | | | |
|---|---|---|---|
| 2,382,824 A | | 4/1942 | Solomon |
| 2,328,786 A | * | 9/1943 | Crowder ........................ 244/7 B |
| 2,444,781 A | * | 7/1948 | Leonard ......................... 244/7 B |
| 2,479,125 A | * | 8/1949 | Leonard ......................... 244/7 B |
| 2,708,081 A | | 5/1955 | Dobson |
| 3,035,789 A | | 5/1962 | Young |
| 3,116,040 A | * | 12/1963 | Petrides et al. ............. 244/17.13 |
| 3,141,633 A | | 7/1964 | MacKay |
| 3,259,343 A | | 7/1966 | Roppel |
| 5,516,060 A | * | 5/1996 | McDonnell .................... 244/7 B |
| 7,118,066 B2 | | 10/2006 | Allen |
| 7,997,526 B2 | * | 8/2011 | Greenley ....................... 244/7 B |
| 8,070,090 B2 | | 12/2011 | Tayman |
| 2007/0187547 A1 | | 8/2007 | Kelly |
| 2011/0042509 A1 | | 2/2011 | Bevirt et al. |
| 2011/0042510 A1 | | 2/2011 | Bevirt et al. |
| 2012/0248259 A1 | * | 10/2012 | Page et al. ...................... 244/7 A |
| 2014/0008498 A1 | * | 1/2014 | Reiter ............................ 244/7 A |

FOREIGN PATENT DOCUMENTS

| | | |
|---|---|---|
| CN | 101450714 | 6/2009 |
| DE | 14 56 113 A1 | 5/1969 |
| WO | WO 98/02350 A1 | 1/1998 |
| WO | WO2009/059173 A1 | 5/2009 |

* cited by examiner

*Primary Examiner* — Joseph W Sanderson
(74) *Attorney, Agent, or Firm* — Tsircou Law P.C.

(57) ABSTRACT

An aircraft for use in fixed wing flight mode and rotor flight mode is provided. The aircraft can include a fuselage, wings, and a plurality of engines. The fuselage can comprise a wing attachment region further comprising a rotating support. A rotating section can comprise a rotating support and the wings, with a plurality of engines attached to the rotating section. In a rotor flight mode, the rotating section can rotate around a longitudinal axis of the fuselage providing lift for the aircraft similar to the rotor of a helicopter. In a fixed wing flight mode, the rotating section does not rotate around a longitudinal axis of the fuselage, providing lift for the aircraft similar to a conventional airplane. The same engines that provide torque to power the rotor in rotor flight mode also power the aircraft in fixed wing flight mode.

23 Claims, 12 Drawing Sheets

LONG ENDURANCE VERTICAL TAKEOFF AND LANDING AIRCRAFT

CROSS-REFERENCE TO RELATED APPLICATIONS

This application claims the benefit of U.S. Provisional Patent Application No. 61/465,760, entitled "RotorWing—A VTOL configuration which merges the wing, rotor, and propulsion system for efficient cruise as an airplane," filed on Mar. 24, 2011.

This application hereby incorporates by reference the above-identified provisional application it its entirety.

BACKGROUND OF THE INVENTION

1. Field of the Invention

The invention relates generally to aircraft designs, and, more particularly, to unmanned aircraft designs that combine the features of fixed wing aircraft and vertical takeoff and landing (VTOL) aircraft.

2. Description of the Related Art

Tactical Unmanned Aerial Vehicles (UAVs) have revolutionized the way wars are fought and intelligence is gathered because of their low-cost, safety, and long endurance. However, one major limitation of current UAVs is the need for prepared launch and recovery sites with large footprints or a traditional airport. A portable system that does not require bulky launch equipment or runways would greatly increase the utility of manned and unmanned aircraft, much as helicopters do for low endurance operations.

Launch and Recovery Equipment (LRE) for UAVs can be comprised of both a launch vehicle as well as a recovery system, such as a large net. This equipment has many operational burdens. First, the LRE site must offer a clear launch and approach path. This path must be obstacle-free over a mile or more beneath a 5 degree flight path, which makes urban basing very difficult. Additionally, some UAVs need two dedicated technicians per shift to handle LRE operations. LRE hardware typically weighs 1,500-3,000 pounds for the launcher, and a similar amount for recovery equipment. These units must be transported to the launch site, which often requires two or more Humvees for transport. Similarly, traditional long range or high endurance manned aircraft need a runway with the attendant clearings below the takeoff and landing flight paths.

Previous aircraft designs attempt to combine the vertical takeoff and landing (VTOL) and hover capabilities of a helicopter with the increased speed and range capabilities of fixed wing aircraft. These hybrid designs reduce the footprint necessary for launch and recovery but are more complex than either helicopters or conventional takeoff and landing aircraft as they generally incorporate multiple propulsion systems, each used for a different flight mode. These designs can include "tail sitter" configurations, so named because the aircraft takes off and lands from a tail-down orientation. Other designs can include "nose sitter" configurations, so named because the aircraft takes off and lands from a nose-down orientation.

One example of a nose-sitter design includes a VTOL hybrid, which includes a conventional propeller for fixed wing flight and a folding rotor near the tail of the aircraft. These designs may have high hover efficiency; however, they also require complex mechanical systems and weigh more than other designs due to the requirement of two separate propulsion systems, one for each flight mode.

Other VTOL designs can include "tail sitter" configurations, so named because the aircraft takes off and lands from a tail-down orientation. Conversion from vertical to horizontal flight for these hybrid designs typically requires a configuration change and dedicated engines for each configuration. Prior solutions that combine VTOL and cruise performance compromise performance in both flight modes.

A VTOL airplane or UAV that uses the same propulsion for both flight modes would have many structural benefits, including reduced complexity and weight of the launch equipment and ease of operation in more remote locations, as well as numerous mission benefits that are enjoyed today by helicopters. These include hover-and-stare in urban-canyons and sit-and-stare for extended silent surveillance. Further, sit-and-wait operation allows the airplane or UAV to be pre-deployed to a forward area awaiting mission orders for remote launch of the aircraft. Upon receiving the mission order, the vehicle can launch without leaving any expensive launch equipment at the launch site.

Some existing VTOL designs suffer from poor endurance and speed. Forward flight efficiency may be improved by partial conversion to an aircraft like the V-22 but endurance issues remain. Many VTOL aircraft also require a high power-to-weight ratio. These aircraft may be used for high-speed flight if the aircraft is fitted with a special transmission and propulsion system. However, achieving high endurance requires efficiency at very low power. Thus the challenge exists to create a virtual gearbox that equalizes power and RPM for VTOL and fixed wing flight achieving highly efficient cruise with the benefits of a vertical takeoff and landing configuration.

SUMMARY OF THE INVENTION

In at least one embodiment, the present application relates to an aircraft that overcomes the shortcomings of the prior art noted above.

In some embodiments, an aircraft and, in particular, an aircraft capable of fixed wing and rotor flight modes is disclosed. A fixed wing flight mode is defined as flight in which a fuselage is substantially parallel to the ground and a rotor flight mode is defined as flight in which a fuselage is substantially perpendicular to the ground. The aircraft comprises a plurality of wings, each wing having a spar such that each wing is rotatable about the spar. The aircraft also comprises at least one actuator coupled to the spar of each of the plurality of wings. The aircraft further comprises a plurality of engines secured to said wings. The aircraft also comprises a fuselage further comprising a rotating support rotatable about a longitudinal axis of the fuselage wherein said plurality of wings are secured to the rotating support such that the wings rotate about a longitudinal axis of the fuselage.

In some embodiments, an aircraft and, in particular, an aircraft capable of fixed wing and rotor flight modes is disclosed. The aircraft comprises a first wing having a spar with a first engine secured at a position between 20% and 75% of semi-span of said first wing and a second wing having a spar with a second engine secured at a position between 20% and 75% of semi-span of said second wing. At least one actuator is coupled to the spar of each of the first and second wings. The aircraft further comprises a fuselage further comprising a rotating support rotatable about a longitudinal axis of the fuselage wherein said first and second wings rotate with respect to said rotating support such that the actuator coupled to the spar of said first wing rotates said first wing in a first direction around the span-wise axis of the first wing and the actuator coupled to the spar of said second wing rotates said second wing in a second direction around the span-wise axis of the second wing such that said first and second engines are directed in different directions causing said first and second wings to rotate about a longitudinal axis of the fuselage due to the thrust provided by each of said engines.

In some embodiments, a method for changing the configuration of an aircraft between flight modes is disclosed. The method is achieved through changing the rate of motion of a rotating portion of a fuselage from a first flight mode to a second flight mode and rotating each of a plurality of wings in opposite directions.

In some embodiments, an aircraft and, in particular, an aircraft capable of fixed wing and rotor flight modes is disclosed. The aircraft comprises a fuselage main body defining a longitudinal axis, a rotating section connected said fuselage main body, and a plurality of engines. The rotating section further comprises a plurality of wings, each wing having a spar such that each wing is rotatable about said spar and at least one actuator coupled to the spar of each of the plurality of wings. The plurality of engines is attached to the rotating section. The rotating section is rotatable around the longitudinal axis.

BRIEF DESCRIPTION OF THE DRAWINGS

These and other features, aspects, and advantages of the present invention will now be described in connection with a preferred embodiment of the present invention, in reference to the accompanying drawings. The illustrated embodiments, however, are merely examples and are not intended to limit the invention.

FIG. 3a is a top view of the aircraft of FIG. 1, shown in fixed wing flight mode;

FIG. 3b is an enlarged view of volume 300 depicted in FIG. 3a;

DETAILED DESCRIPTION OF THE PREFERRED EMBODIMENT

The following detailed description is directed to certain specific embodiments of the invention. However, the invention may be embodied in a multitude of different ways as defined and covered by the claims.

Embodiments of the invention can provide the features of both vertically flying, or hovering, aircraft and fixed wing aircraft. An aircraft that is changing altitude while traveling in a substantially vertical direction with the fuselage substantially perpendicular to the ground is defined to be in rotor flight mode. The same aircraft flying horizontally with the fuselage substantially parallel to the ground is defined as flying in a fixed wing flight mode. Some embodiments of the invention desirably result in increased efficiency and long range flight endurance.

Figure 12:
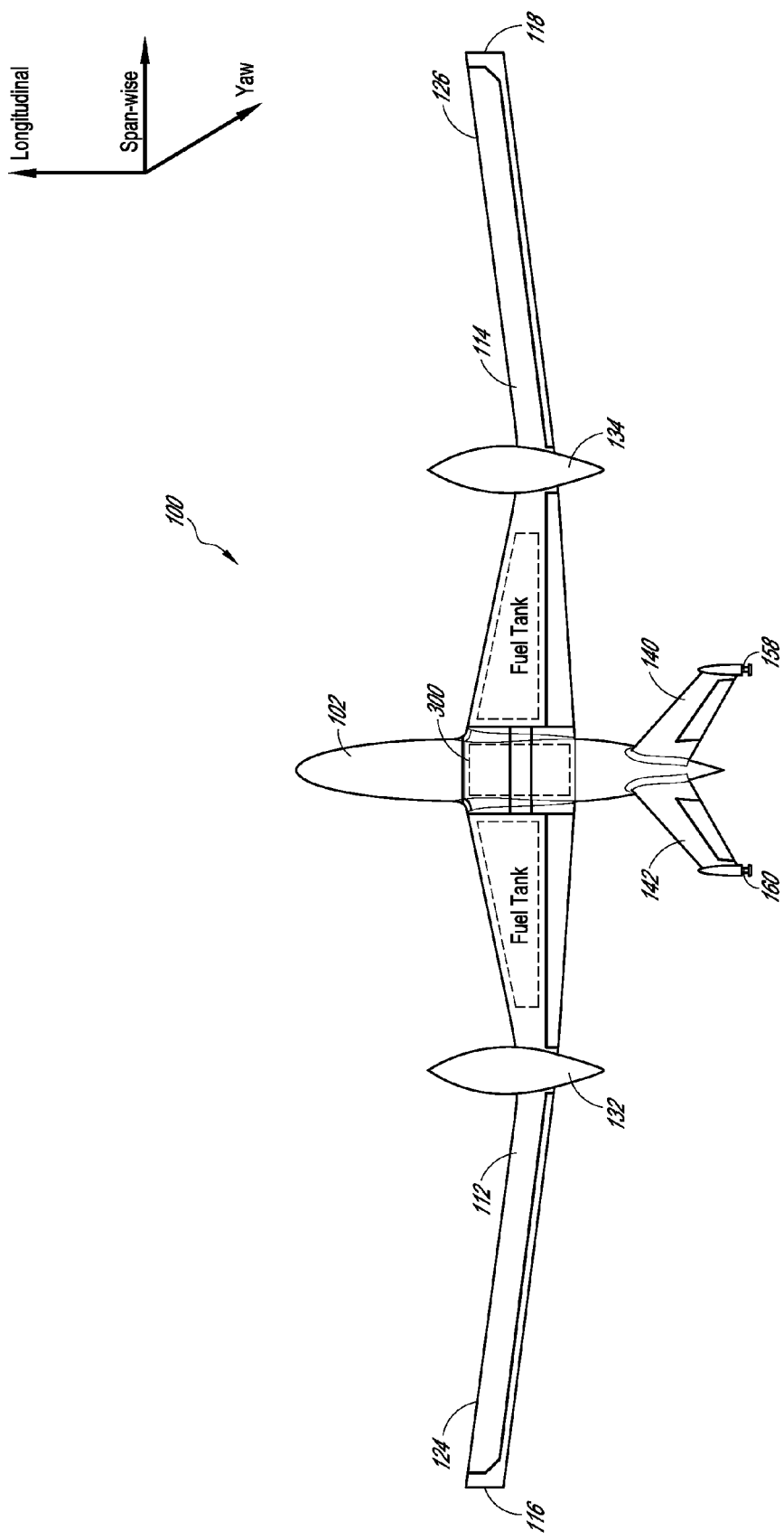
FIG. 12 is a view of another embodiment of the aircraft having jet engines.

A preferred embodiment of the invention combines the wing function of a fixed wing aircraft and the rotor function similar to that provided by a traditional helicopter rotor. In a preferred embodiment, when the aircraft is in rotor flight mode, the wings rotate around the fuselage, the rotation of the wings propelled by the same engines and propellers that are used for cruise as an airplane. The rotation of the wings acts similarly to the rotor of a traditional helicopter, providing vertical thrust to vertically propel the aircraft and maintain a hovering altitude. In the same preferred embodiment, when the aircraft is in fixed wing mode, the wings do not rotate around the fuselage and the same engines that provided torque to rotate the wings when the aircraft was in hover mode provide the thrust required to power the aircraft in fixed wing flight. This arrangement provides the features of a rotor flight, aircraft and a fixed wing aircraft while reducing performance losses due to the weight requirements of complex mechanical machinery needed for configuration changes. The preferred embodiment also eliminates the need for the aircraft to carry multiple propulsion systems for flight in more than one flight mode. Embodiments of the invention can include features such as but not limited to improved payload capacity, vertical take off and landing (VTOL) capability, efficient hover, high speed, and long range endurance in a single flight. While the preferred embodiment discussed below includes engines with propellers, other embodiments may include jet engines, as pictured in FIG. 12.

Figure 1:
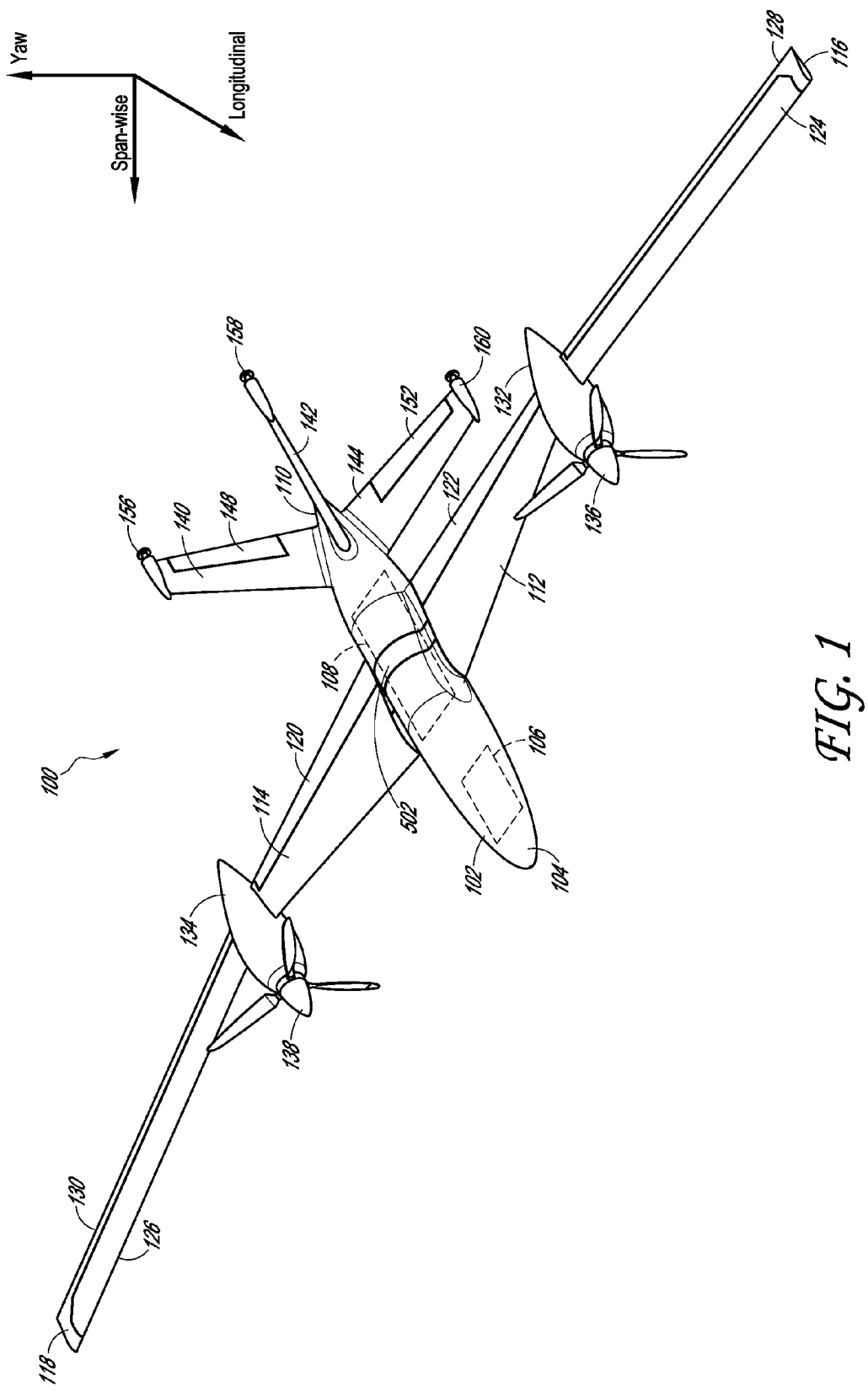
FIG. 1 is a perspective view of an aircraft according to a preferred embodiment of the invention that converts between rotor flight mode and fixed wing flight mode, shown in fixed wing flight mode.

FIG. 1 depicts a preferred embodiment of the invention. In FIG. 1 the aircraft 100 is shown in fixed wing flight mode, similar to that of a conventional airplane, such as a Piper Seneca or Beech King-Air. The aircraft 100 comprises a fuselage main body 102 having nose 104, payload compartment 106, wing attachment region 108, and tail section 110. The wing attachment region 108 further comprises a rotating support or portion 502. The wings 112, 114 may be attached to rotating support 502. The fuselage 102 may be shaped as a cylinder with tapered ends or may be of other shapes known by those skilled in the art.

The payload compartment 106 may be located within the fuselage 102 between the nose 104 and wing attachment region 108. For example, in the illustrated embodiment the payload compartment 106 may have a volume of 250 cubic inches. Alternative embodiments may have a payload compartment 106 volume between 50 cubic inches and 10,000 cubic inches, desirably between 100 cubic inches and 5,000 cubic inches, more desirably between 150 cubic inches and 1,000 cubic inches, and even more desirably between 200 cubic inches and 800 cubic inches. However, the payload compartment 106 may be smaller or larger depending on the overall size of the aircraft and mission requirements.

Figures 3A, 3B:
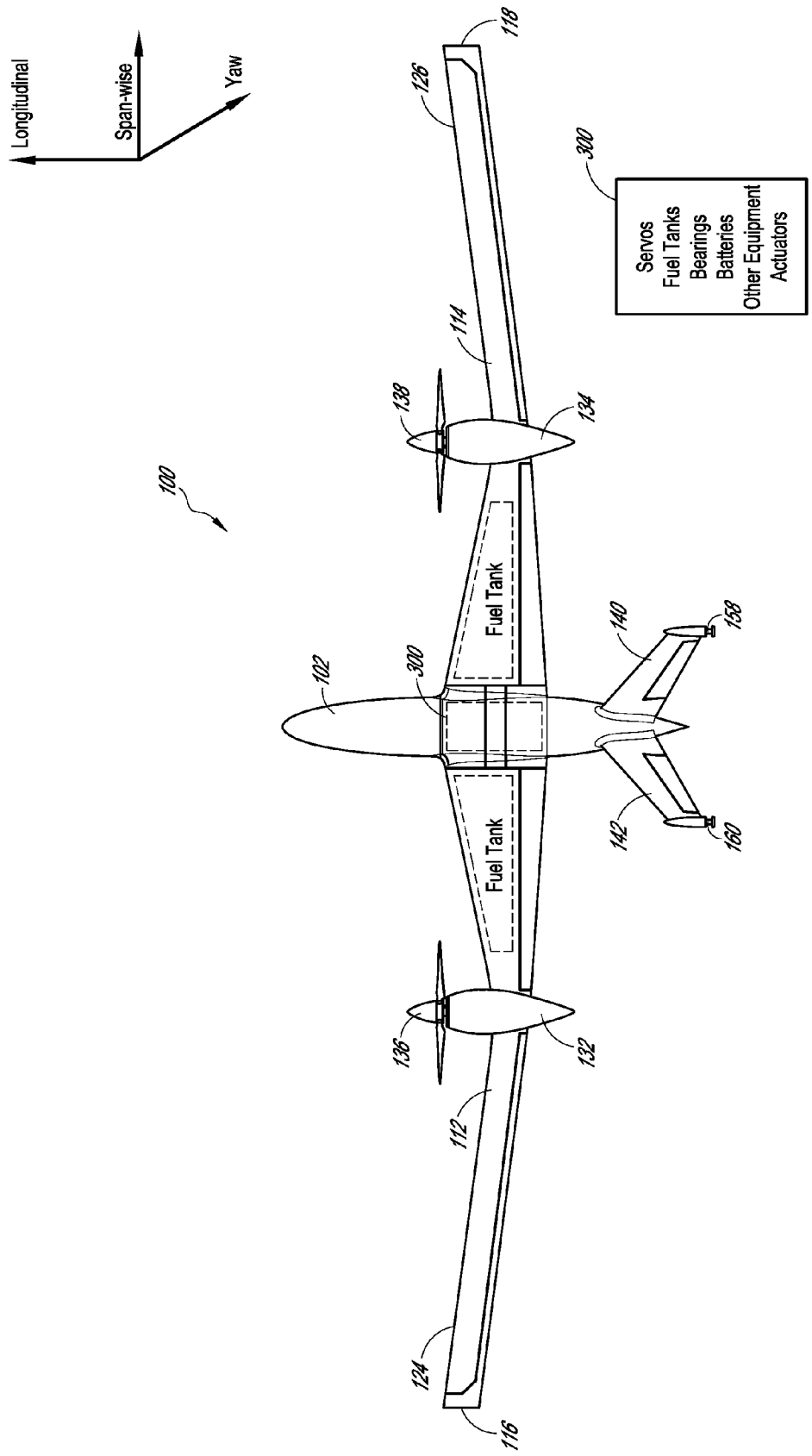

FIG. 3a shows that the interior of the fuselage 102 may also comprise a volume 300, shown enlarged in FIG. 3b, which contains a flap and lag bearing, a centrifugal bearing, servos to control wing surfaces, actuators to control wing rotation, batteries, and power regulation equipment, as well as fuel tanks or other mission specific equipment. The interior equipment may be placed such that it does not interfere with the rotation of the wing attachment region 108 of the fuselage, discussed below.

As seen in FIGS. 1-8, the wings 112, 114 are attached to the wing attachment region 108 of the fuselage 102 with one wing on each side of the fuselage. As pictured in FIG. 4, the wing attachment region 108 comprises a rotating support 502 to which the wings 112, 114 preferably attach. The wings 112, 114 and rotating support 502 rotate around a longitudinal or lengthwise axis of the fuselage 102 when the aircraft 100 is in rotor flight mode. The rotating support 502 is preferably locked to the fuselage 102 to prevent rotation about a longitudinal axis of the fuselage when the aircraft is in fixed wing flight mode. The wing attachment region 108 may desirably comprise a length of the fuselage equal to the chord length of the wings at the point of attachment with the wing attachment region 108, or it may be of lesser or greater length.

As pictured in FIG. 1, the wings 112, 114 may also comprise one or more control surfaces 120, 122 to control the attitude of the aircraft while in both fixed wing and in rotor flight modes. These control surfaces may be controlled by servos located within the fuselage 102 of the aircraft 100.

In a preferred embodiment the wings may comprise a symmetric airfoil. The wings 112, 114 each have a leading edge 124, 126, and a trailing edge 128, 130. The wings 112, 114 preferably have a greater chord length, or leading edge 124, 126 to trailing edge 128, 130, closer to the fuselage 102, as shown in FIG. 1, or the wings 112, 114 may have substantially the same chord length along the span of the wing from wing tip 116 to wing tip 118.

Figure 2:
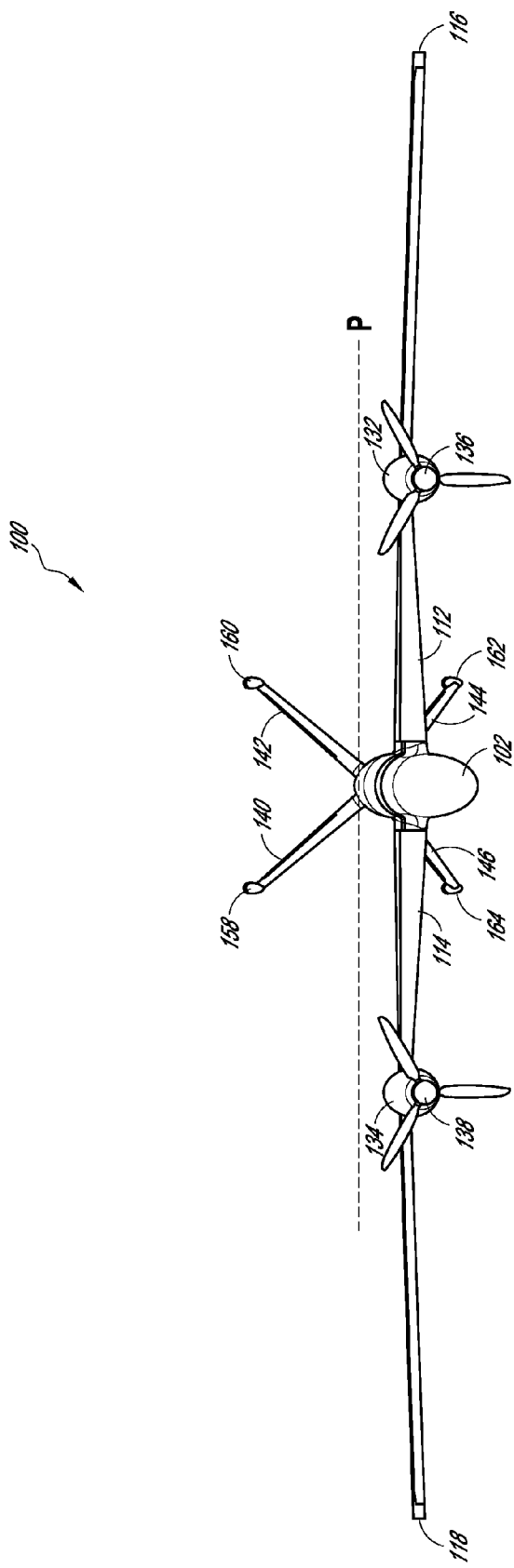
FIG. 2 is a front perspective view of the aircraft of FIG. 1, shown in fixed wing flight mode.
Figure 11:
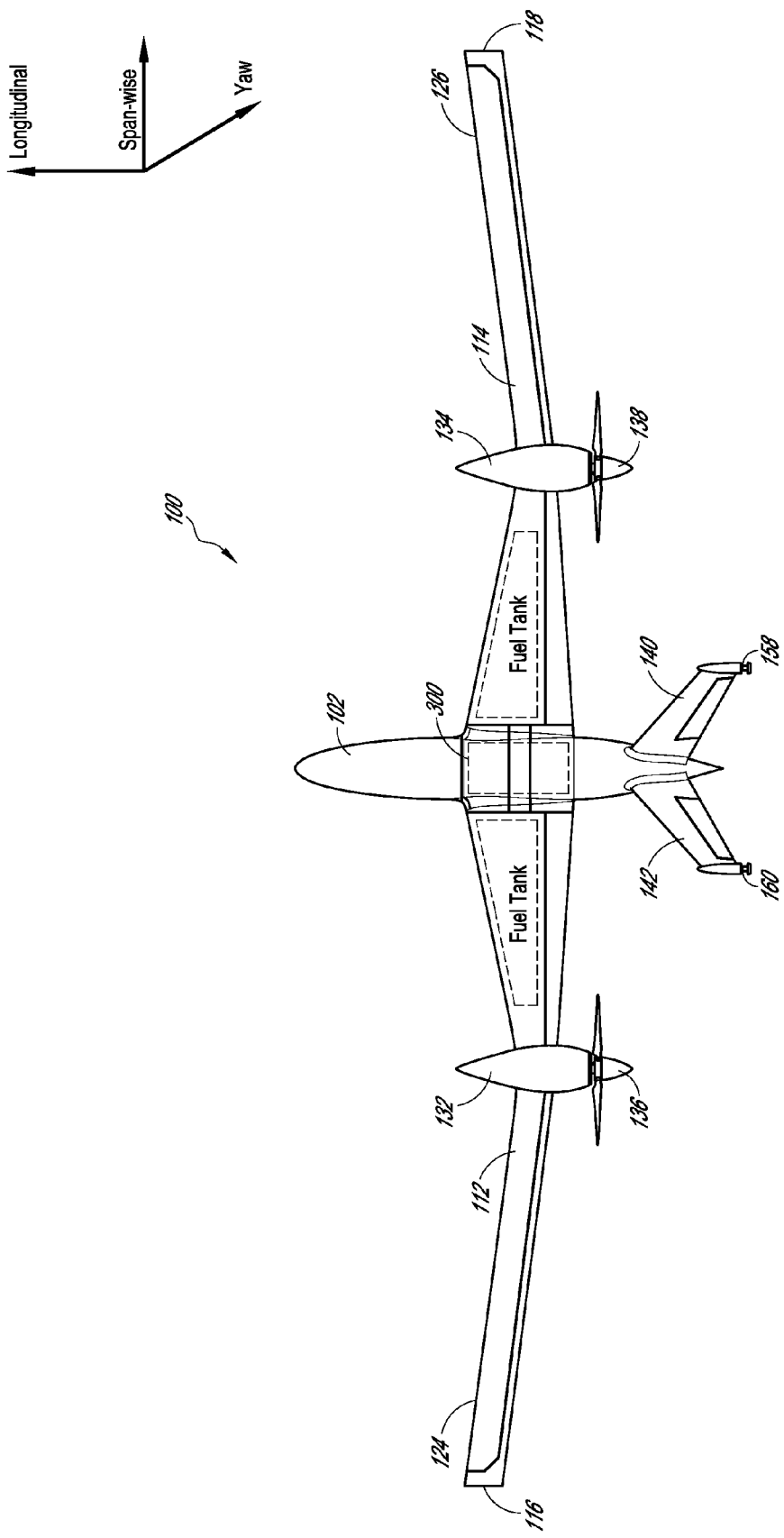
FIG. 11 is a top view of an aircraft with the engines and propellers in a "pusher" style configuration in which the propellers push the aircraft through the air rather than pull the aircraft.

In FIG. 1 one engine 132, 134 is secured to each wing 112, 114. In other embodiments, one or more engines may be secured to each wing 112, 114. A rotating section includes the wings 112, 114 and the rotating support 502. The engines 132, 134 with propellers 136, 138 are connected to the rotating section. In a preferred embodiment, the engines 132, 134 of the aircraft 100 are aligned substantially parallel with a longitudinal axis of the fuselage with the propellers 136, 138 configured to pull the aircraft 100 through the air when the aircraft 100 is in fixed wing flight, as depicted in FIG. 2. In this flight mode, the rotating section, comprised of wings 112, 114 and rotating support 502 with engines 132, 134 and propellers 136, 138 attached to the rotating section, does not rotate about a longitudinal axis of the fuselage 102. In other embodiments, the engines 132, 134 and propellers 136, 138 may be configured in a push-type configuration in which the propellers 136, 138 are oriented toward the tailing edge 128, 130 of the wings 112, 114 to push the aircraft 100 rather than to pull the aircraft 100 when the aircraft 100 is flying in a fixed wing flight mode. A "pusher" style configuration where the engines and propellers are oriented to push the aircraft 100 through the air is shown in FIG. 11.

The fuselage 102 may also comprise a tail section 110, as depicted in FIG. 1. The tail section 110 may be comprised of three or more stabilizing surfaces 140, 142, 144, 146 extending from the fuselage 102 in approximately equal intervals about the circumference of the tail section 110. In a preferred embodiment shown most clearly in FIGS. 3 and 4, four tail stabilizing surfaces are shown, though other embodiments may have a different number of tail stabilizing surfaces. A plurality of tail stabilizing surfaces 140, 142, 144, 146 may incorporate a control surface 148, 150, 152, 154 such as a rudder or ruddervator surface to control the attitude of the aircraft while in flight. The control surfaces 148, 150, 152, 154 may be controlled by servos located within the tail section 110 of the fuselage 102. As shown in FIG. 1, tail stabilizing surfaces 140 and 144 comprise control surfaces 148, 152; however, the other tail surfaces 142 and 146 may also comprise control surfaces. In a preferred embodiment, each tail stabilizing surface 140, 142, 144, 146 has a control surface 148, 150, 152, 154. The control surfaces on tail stabilizing surfaces 142, 146 are not shown in FIG. 1. Each control surface 148, 150, 152, 154 can act independently or together with the other control surfaces as a rudder or ruddervator to control the direction of the aircraft's flight in the yaw direction. The yaw direction is defined as rotation about an axis perpendicular to the horizontal plane P of the aircraft defined by the wings when in a fixed wing flight mode and a longitudinal axis of the fuselage. In other embodiments, more or fewer tail surfaces may comprise control surfaces for controlling the attitude of the aircraft 100.

Each tail stabilizing surface 140, 142, 144, 146 may also have one or more landing pads 156, 158, 160, 162 to contact the ground and support the aircraft 100 while it is in a "tail-sitter" configuration at the launch site in preparation for launch or when the aircraft lands. FIGS. 1 and 2 depict a preferred embodiment in which one landing pad 156, 158, 160, 162 is located at the tip of each tail stabilizing surface 140, 142, 144, 146 for contact with the ground to support the aircraft 100 prior to and during launch and after landing.

FIG. 2 is a perspective view of the aircraft 100 from a nearly head-on position when the aircraft is in a fixed wing flight mode for horizontal flight as an airplane. In this preferred embodiment, the wings 112, 114 and rotating support 502 of the aircraft 100 may be locked with respect to the fuselage 102, meaning that they may not be permitted to rotate about a longitudinal axis of the fuselage 102. In FIG. 2, each wing 112, 114 has been rotated such that the propeller 136, 138 of each engine 132, 134 is located substantially in the desired direction of travel.

The embodiment depicted in FIG. 2 also illustrates that the engines 132, 134 are secured to the wings 112, 114 and are not located within the fuselage 102. Locating the engines 132, 134 on the wings 112, 114 may reduce or eliminate the need for extension shafts in a preferred embodiment. Extension shafts typically connect an engine mounted within or directly on the fuselage via a gearbox or other linkage to the propellers on the wing. Locating the engines within or directly on the fuselage typically also requires a central gearbox located within the fuselage. By eliminating the extension shafts and the central gearbox in a preferred embodiment, the weight of the aircraft 100 may be decreased, allowing for greater payload capacity, longer range, and endurance, among other benefits conceivable by those skilled in the art.

However, in other embodiments, engines 132, 134 may be secured at any point on the rotating section comprising the wings 112, 114 and rotating support 502. In the illustrated embodiment, two engines are depicted. Additional embodiments may have more or fewer numbers of engines depending on mission requirements, other aircraft design considerations, or other considerations known to those skilled in the art.

FIG. 2 further illustrates that, in a preferred embodiment, the engines 132, 134 are attached to the wings 112, 114 at a position an equal distance to either side of the fuselage 102.

Locating the engines 132, 134 in this balanced orientation may provide benefits of balance and stability to the aircraft. Additionally, the engines 132, 134 are preferably secured to the wings 112, 114 at an equalizing position along the semi-span of each wing, defined as the distance along the wing 112 or 114 from the wing attachment region 108 to the wing tip 116 or 118. When the engines 132, 134 are located at the equalizing position in a preferred embodiment, the thrust of the engines 132, 134 and the flight speed of aircraft 100 when the aircraft 100 is flying in a fixed wing flight mode desirably equal the torque and rpm, or rotations per minute, required by the aircraft 100 when the wings rotate around a longitudinal axis of the fuselage 102 when the aircraft 100 is operating in a rotor flight mode. In a preferred embodiment, the torque demands of the wings 112, 114 when acting as a rotor are matched to the in-flight demands of the aircraft 100 when flying in fixed wing mode, using the same engines 132, 134 and propellers 136, 138. Locating the engines 132, 134 at the point where these demands are matched may also allow the wing tip 116, 118 speed to approach sonic (when the wings 112, 114 are acting as a rotor in rotor flight mode) while keeping the blades of the propellers 136, 138 well under sonic. Locating the engines 132, 134 at the point where these forces and requirements equalize preferably eliminates the need for complex gearboxes and other heavy equipment that may decrease the long range endurance capabilities of the aircraft. Additional discussion of the determination of this point where these forces and requirements equalize is included below.

In a preferred embodiment, the aircraft 100 may have multiple tail surfaces 140, 142, 144, 146 to control the aircraft's attitude while in flight. In FIG. 2, the aircraft 100 is depicted in a preferred embodiment with four tail surfaces 140, 142, 144, 146. FIG. 2 depicts a horizontal plane P defined by an axis of symmetry of wings 112, 114 and a longitudinal axis of the fuselage 102. In the pictured embodiment, two tail surfaces 140, 142 appear above the horizontal plane P of the aircraft and two of the tail surfaces 144, 146 appear below the horizontal plane P. The spacing of the tail surfaces 140, 142, 144, 146 around the tail section 110 of the fuselage 102 may provide stability for the aircraft 100 when it is resting on the landing pads 158, 160, 162, 164 located on the ends of each tail surface 140, 142, 144, 146 prior to and during launch or after landing. The landing pads 158, 160, 162, 164 prevent damage to the tail stabilizing surfaces 140, 142, 144, 146 by providing a stable support upon which the aircraft 100 can rest prior to and during launch and after landing. The aircraft 100 may be comprised of more or fewer tail stabilizing surfaces 140, 142, 144, 146 which may or may not be equipped with landing pads 158, 160, 162, 164, depending on the configuration of the aircraft and launch and landing requirements of the aircraft.

FIG. 3a depicts an overhead view of the aircraft 100 in fixed wing flight mode. In this flight mode, the leading edges 124, 126 of the wings 112, 114 preferably face substantially in the same direction as a longitudinal axis of the fuselage. The engines 132, 134 and propellers 136, 138 also face in the same direction as a longitudinal axis of the fuselage and provide the necessary power to propel the aircraft 100 through the air in flight similar to that of a conventional airplane. The wings 112, 114 are preferably attached to the fuselage 102 via rotating support 502 located within the wing attachment region 108. Rotating support 502 is a section of the fuselage 102 that has the ability to rotate around a longitudinal axis of the fuselage 102. The rotating support 502 may be locked, preventing rotation with respect to the fuselage 102, but such locking is not required. As shown in FIG. 3a, at least one landing pad 158, 160 may be located at the tip of each tail stabilizing surface 140, 142 for contact with the ground to support the aircraft prior to and during launch and after landing. The interior of the wings 112, 114 may also comprise one or more fuel tanks for supplying the engines, as pictured in FIG. 3a.

Figure 4:
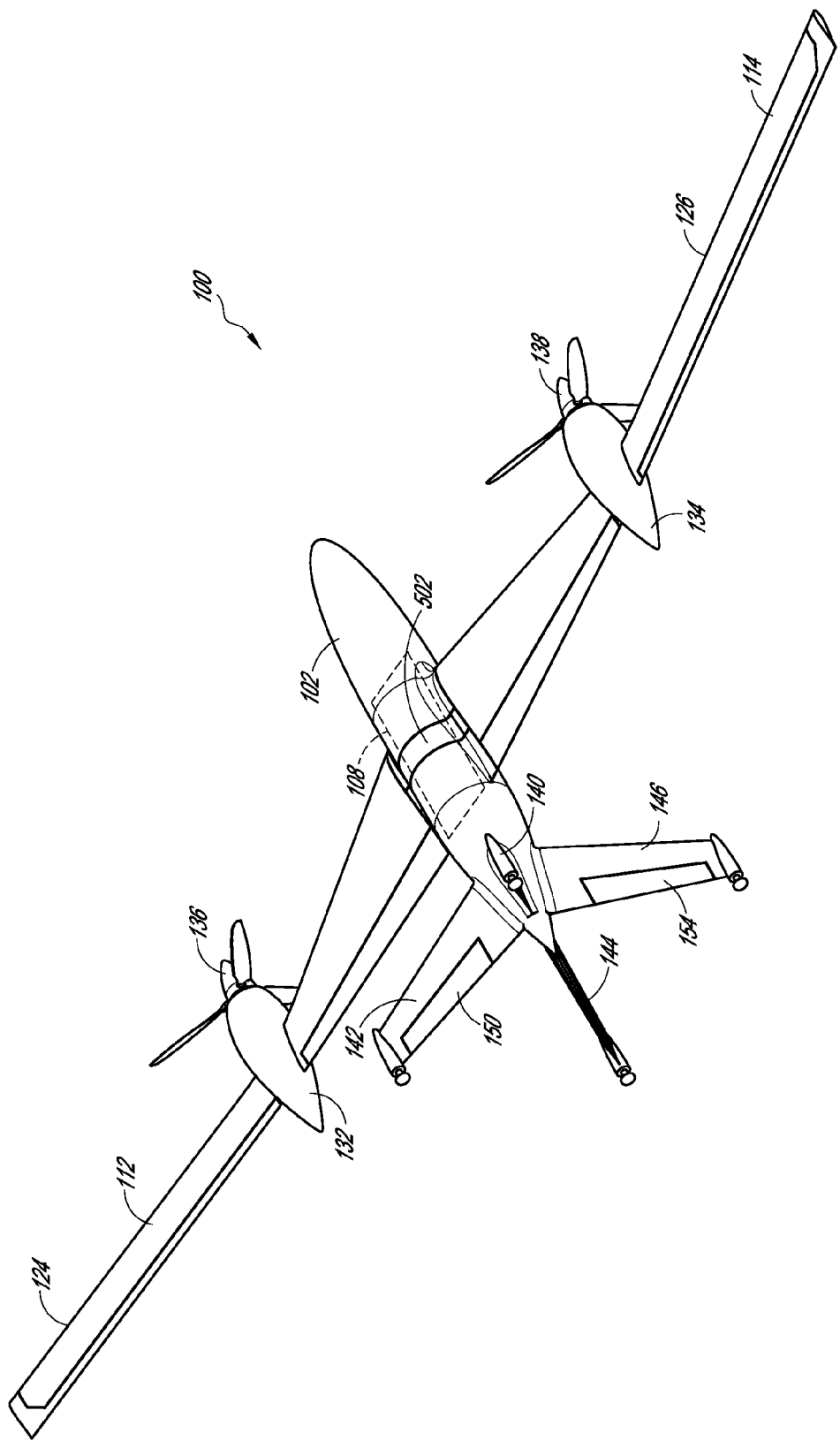
FIG. 4 is a rear perspective view of the aircraft of FIG. 1, shown in fixed wing flight mode.

A rear perspective view of a preferred embodiment of the aircraft in fixed wing flight mode is depicted in FIG. 4. As described above with respect to FIGS. 1-3, preferably the leading edges 124, 126 of the wings 112, 114 point substantially in the direction of travel similar to a conventional airplane such a Piper Seneca or Beech King-Air. The wings 112, 114 are attached to rotating support 502, which is part of wing attachment region 108 of the fuselage 102. In the fixed wing flight mode pictured in FIG. 4, the wings preferably do not rotate about a longitudinal axis of the fuselage 102. The engines 132, 134 with their attached propellers 136, 138 point in substantially the same direction, as for a conventional airplane, and provide thrust to power the aircraft 100 in a fixed wing flight mode. In this embodiment, the tail section 110 of the fuselage 102 comprises four tail stabilizing surfaces 140, 142, 144, 146. As has been discussed above, other embodiments of the aircraft may comprise fewer or greater numbers of tail stabilizing surfaces. FIG. 4 clearly depicts two of the tail stabilizing surfaces, specifically 142 and 146, which further comprise control surfaces 150, 154; however, the other tail stabilizing surfaces 140 and 144 may also comprise control surfaces. As discussed above with respect to FIG. 1, these control surfaces may act independently or together to control the attitude of the aircraft 100 while in flight. These control surfaces may preferably be controlled by servos located within the tail section 110 of the fuselage 102.

Figure 5:
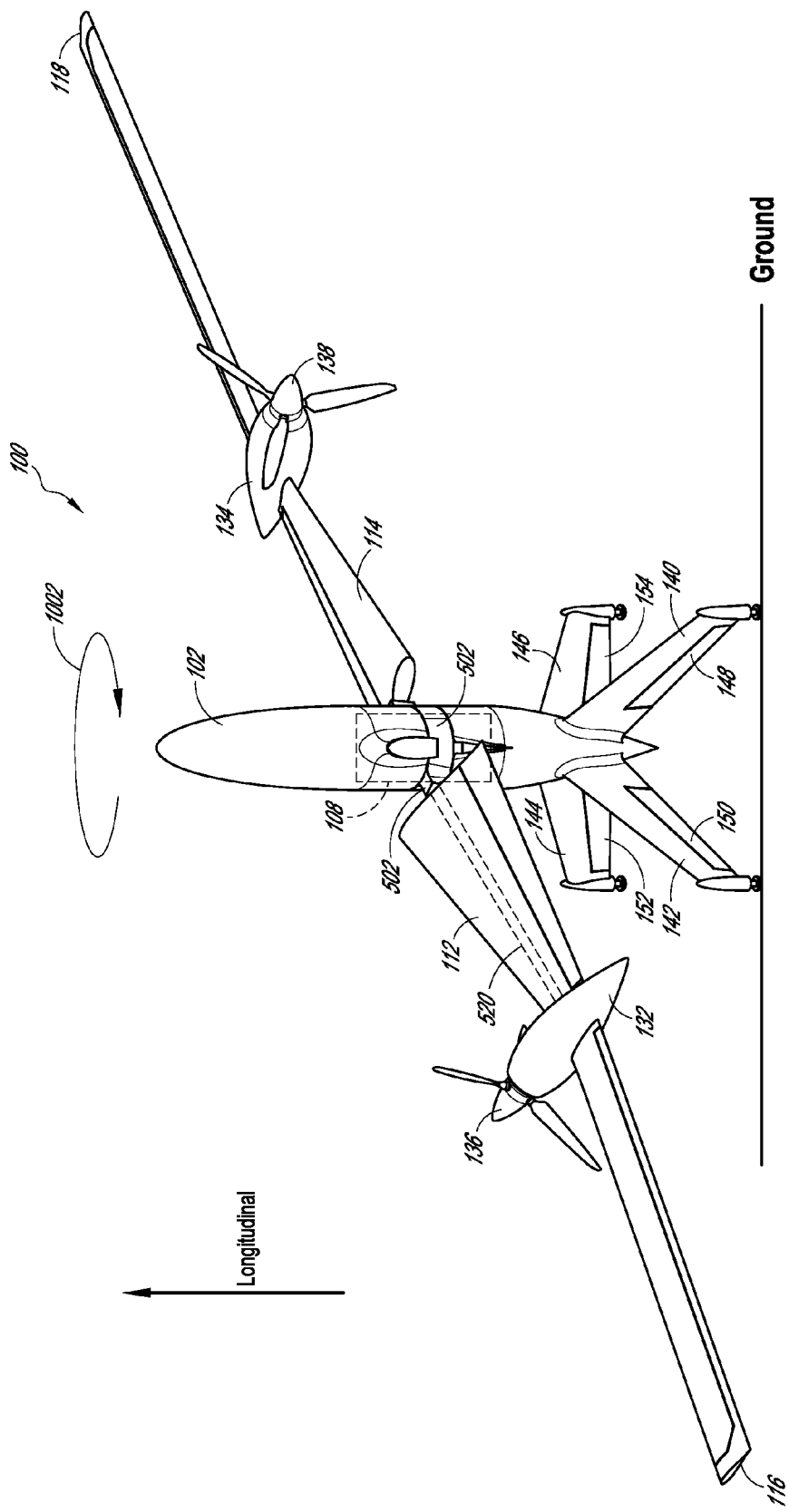
FIG. 5 is a perspective view of the aircraft of FIG. 1, shown in rotor flight mode prior to launch or after landing on the ground.

For flight in rotor flight mode, each wing 112, 114 may preferably be rotated nearly 90 degrees in opposite directions about their length or span-wise axis, as illustrated in a preferred embodiment in FIG. 5, such that the engines 132, 134 face in different directions. However, in other embodiments, each wing 112, 114 could rotate between 30 and 100 degrees in opposite directions, between 60 and 90 degrees in opposite directions, and between 75 and 85 degrees in opposite directions. In some embodiments, each wing 112, 114 rotates at least 90 degrees, while in other embodiments each wing 112, 114 rotates at least 60 degrees, while in still further embodiments, each wing 112, 114 rotates at least 30 degrees. In some embodiments, the wings 112, 114 may be rotated in opposite directions such that the included angle between them is between 30 degrees and 180 degrees. However, in other embodiments the included angle between wings 112, 114, and by extension, the included angle between engines 132 and 134, could be between 60 and 180 degrees, between 90 and 180 degrees, between 120 and 180 degrees or between 150 and 180 degrees. In other embodiments, the included angle between engines 132 and 134 and wings 112 and 114 could be at least 30 degrees, at least 60 degrees, at least 90 degrees, at least 120 degrees, or at least 150 degrees. In other embodiments, wing 112 and wing 114 may not each rotate the same amount. In these embodiments, wing 112 may rotate forward or backward between 30 and 100 degrees, between 60 and 90 degrees, or between 75 and 85 degrees. Correspondingly, wing 114 may rotate backward or forward between 30 and 100 degrees, between 60 and 90 degrees, or between 75 and 85 degrees. Preferably, wings 112 and 114 rotate at least 30 degrees in opposite directions but in other embodiments wings 112, 114 may rotate at least 60 degrees or at least 90 degrees. FIG. 5 depicts one embodiment of the aircraft 100 after the wings 112, 114 have been rotated in opposite directions. The rotation of the wings 112, 114 may preferably be achieved by servos or actuators located within the fuselage 102.

Additionally, engines 132, 134 may also rotate relative to the wings 112, 114 around a span or lengthwise axis of the wings 112, 114. The rotation of engines 132, 134 around a spanwise axis of the wings 112, 114 may be in addition to the rotation of wings 112, 114 described above. The rotation of engines 132, 134 may be between 0 and 20 degrees, desirably between 0 and 10 degrees, or more desirably between 0 and 5 degrees.

Preferably, the wings 112, 114 each have at least one spar. A spar runs lengthwise along the internal or external span of the wing from connection with the fuselage to the wing tip to provide structural rigidity. At least one spar of each wing 112, 114 attaches to the rotating support 502 of wing attachment region 108 of the fuselage. FIG. 5 depicts one spar 520 of wing 112 connected to rotating support 502 in wing attachment region 108. The wings may rotate about the spar or a span-wise or wing tip to wing tip axis of the wing to position the wings 112, 114 for hover or vertical flight. Desirably, spar 520 extends at least to the point of attachment of engine 132 on wing 112 to provide structural rigidity to the wing 112. Wing 114 may be attached to wing attachment region 108 via a second spar, not shown in FIG. 5. Wing 112 is preferably able to rotate as described above about the spar 520 to orient engine 132 and propeller 136 to a new direction required to power rotation of wing 112 around a longitudinal axis of fuselage 102. Desirably, wing 114 also rotates about a second spar to achieve the orientation of engine 134 and propeller 138 as depicted in FIG. 5.

After rotation, the propellers 136, 138 of each engine 132, 134 face in substantially opposite directions, as shown in a preferred embodiment in FIG. 5. Each wing 112, 114 is mounted to the rotating support 502 located within wing attachment region 108 of the fuselage 102. The rotating support or portion 502 may be a section of the fuselage 102 that comprises a solid disk or it may be a hollow member that may be barrel shaped. The rotation of a rotating section, comprised of the wings 112, 114 and rotating support or portion 502 along with engines 132, 134 attached to the rotating section, occurs as a result of the power generated by the engines 132, 134. The power generated by engines 132, 134 when the wings 112, 114 are in the preferred embodiment as shown in FIG. 5 results in the wings 112, 114 acting like the rotor of a conventional helicopter. The wings 112, 114 provide thrust in a generally upward direction, causing the aircraft 100 to fly upwards in a substantially vertical direction or to hover at a specified altitude.

As shown in FIGS. 5, 6, 7, and 8 the engines 132, 134 preferably are attached to the wings 112, 114 such that the rotating inflow speed of air to the engines 132, 134 when the wings 112, 114 are acting as a rotor is substantially similar to the cruise inflow speed of air to the engines 132, 134 when the aircraft 100 is flying in fixed wing mode. This preferably allows the propellers 136, 138 and the engines 132, 134 of the aircraft 100 to be optimized for efficient cruise. The aircraft 100 also relies on the same engines 132, 134 as those used for vertical takeoff and landing and hovering flight when the aircraft 100 is in fixed wing flight. In a preferred embodiment, there is no torque-to-ground force as is found with traditional helicopter designs, so no tail rotor is needed. Instead, the tail surfaces 140, 142, 146, 148 are located in the rotorwash, defined as air driven downwards by the rotation of the wings 112, 114 of the aircraft 100 around a longitudinal axis of the fuselage 102 when the wings 112, 114 operate as a rotor for rotor flight. The location of the tail surfaces 140, 142, 144, 146 in this rotorwash, plus small control surface 148, 150, 152, 154 deflections, can cancel the small torque forces due to bearing drag that act to rotate the fuselage 102 in the same direction of rotation as the wings 112, 114 when they act as a rotor. Desirably, after balancing rotor torque with throttle and rotor lift with pitch, (forces created by the rotation of the wings 112, 114 around a longitudinal axis of the fuselage 102) the aircraft 100 ascends. Fuselage roll control is affected by the interaction of the tail control surfaces 148, 150, 152, 154 and the rotorwash generated by the rotation of the wings 112, 114 about a longitudinal axis of the fuselage 102 when the wings 112, 114 are acting as a rotor. Fuselage roll is defined as rotation about a longitudinal axis of the fuselage 102. The yaw directions is an axis perpendicular to a plane defined by a longitudinal axis of the fuselage 102 and the span of the wings 112, 114 when the wings 112, 114 do not rotate relative to a longitudinal axis of the fuselage 102.

As shown in FIG. 5, takeoff and rotor flight is achieved when the wings 112, 114 are preferably oriented substantially parallel to the ground with the engines 132, 134 facing in opposite directions. FIG. 5 depicts one embodiment of the invention in which one engine 134, 136 is attached to each wing 112, 114; however, a different number of engines may be attached to each wing. The application of power via the rotation of the propellers 136, 138 attached to each engine 134, 136 causes the wings 112, 114 to rotate around a longitudinal axis of the fuselage 102 similar to a helicopter rotor in the direction indicated 1002 in FIG. 5. The pitch, or angle of attack, of each wing 112, 114 may be altered at the same time (known in the art as collective pitch) or may be changed depending on the position of each wing 112, 114 as it rotates (known in the art as cyclic pitch). These pitch changes may be provided by control surfaces on the wings 112, 114 such as flaps, tabs with free-to-pitch wing bearings, or dedicated servos. As depicted in FIG. 5, the engines 132, 134 are attached to the wings 112, 114 at a position where the torque demands of the rotor created by the rotation of the wings 112, 114 about a longitudinal axis of the fuselage 102 are matched to the in-flight demands of the aircraft 100 when the wings 112, 114 do not rotate relative to the fuselage in fixed wing flight mode. In a preferred embodiment such as that shown in FIGS. 1-10, the aircraft 100 uses the same engines 132, 134 and propellers 136, 138 for flight in fixed wing mode and rotor flight mode. This configuration may also allow the rotor tips 116, 118 to approach sonic speed while keeping the propellers 136, 138 well under sonic.

Figure 6:
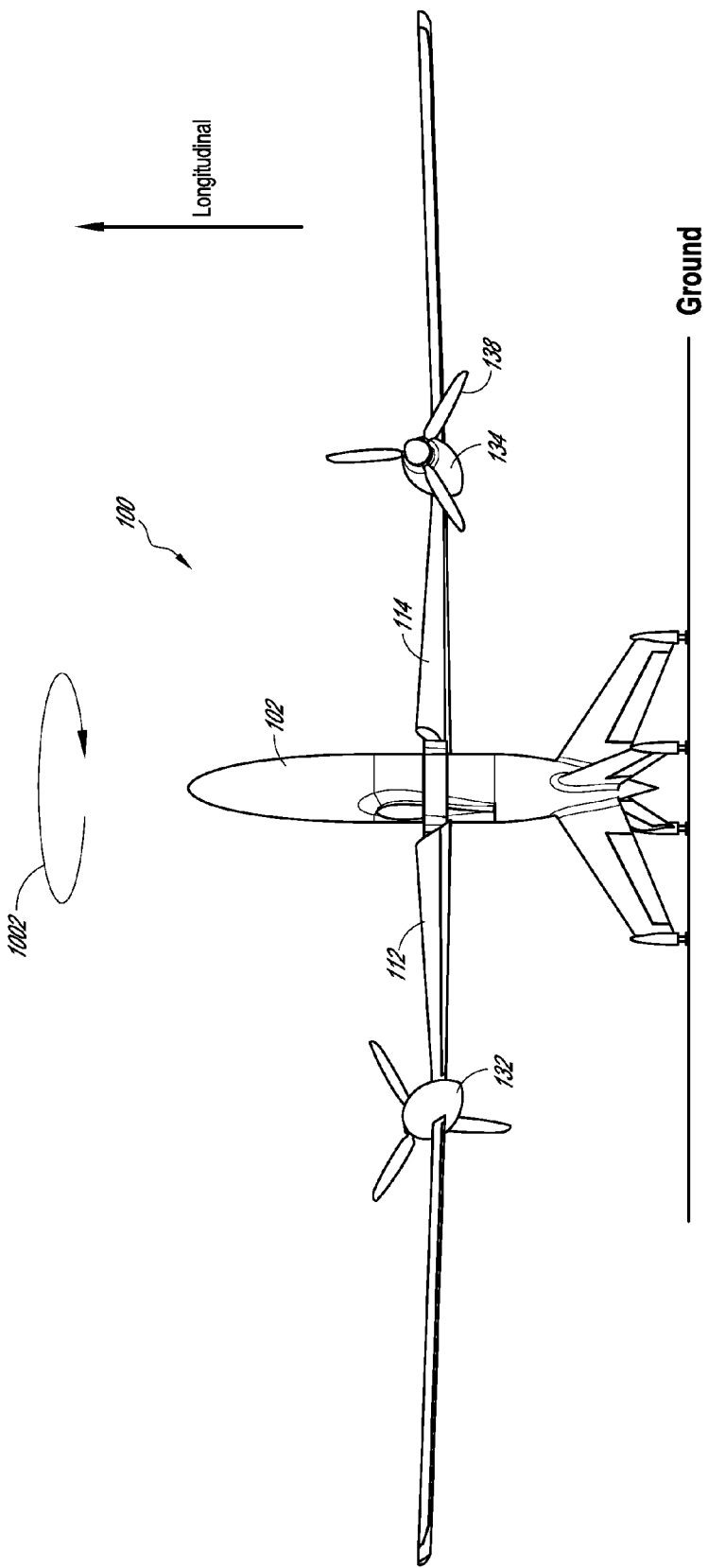
FIG. 6 is a side view of the aircraft of FIG. 1, shown in rotor flight mode prior to launch or after landing on the ground.
Figure 7:
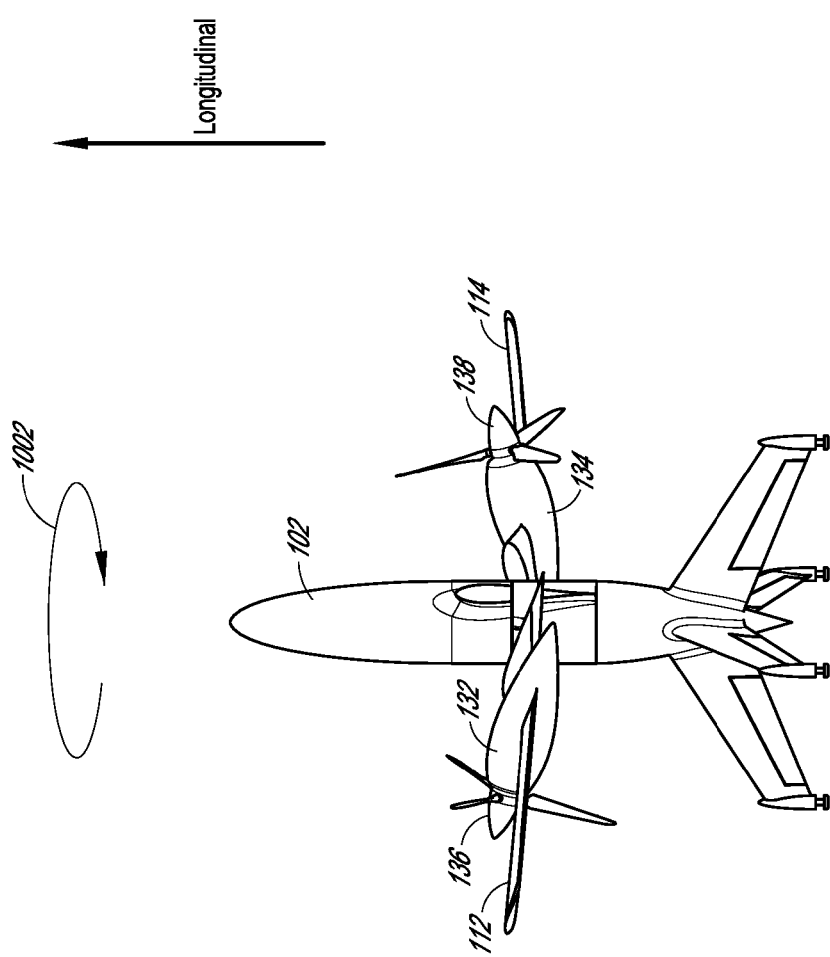
FIG. 7 is a side view of the aircraft of FIG. 1, shown in rotor flight mode with the wings having rotated about a longitudinal axis of the fuselage.

FIGS. 6 and 7 are side views of a preferred embodiment of the aircraft 100 in a rotor flight mode configuration. As described above with respect to FIG. 5, the wings 112, 114 are desirably rotated in opposite directions along a span-wise axis of the wings 112, 114. In the preferred embodiment pictured, the orientation of the wings 112, 114 enables the thrust generated by the propellers 136, 138 to turn the wings 112, 114 about a longitudinal axis of the fuselage 102 in the direction indicated 1002. For example, the same engines 132, 134 and propellers 136, 138 that provide the thrust necessary to turn the wings 112, 114 like a rotor when the aircraft 100 is in rotor flight mode also provide between 50% and 100% of the thrust necessary to fly the aircraft 100 in fixed wing flight mode, as depicted in FIGS. 1-4. In other embodiments, engines 132, 134 desirably provide between 75% and 100% of the thrust necessary to fly the aircraft 100 in fixed wing flight mode, and more desirably provide between 90% and 100% of the thrust necessary to fly the aircraft 100 in fixed wing flight mode as shown in FIGS. 1-4. In some embodiments, at least 50% of the thrust necessary to fly aircraft 100 in fixed wing flight mode is provided by the same engines 132, 134 that power the aircraft in rotor flight mode, while in other embodiments desirably at least 75% of the necessary thrust is provided by the same engines 132, 134, while in still other embodiments more desirably at least 90% of the necessary thrust is provided by the same engines 132, 134.

Figure 8:
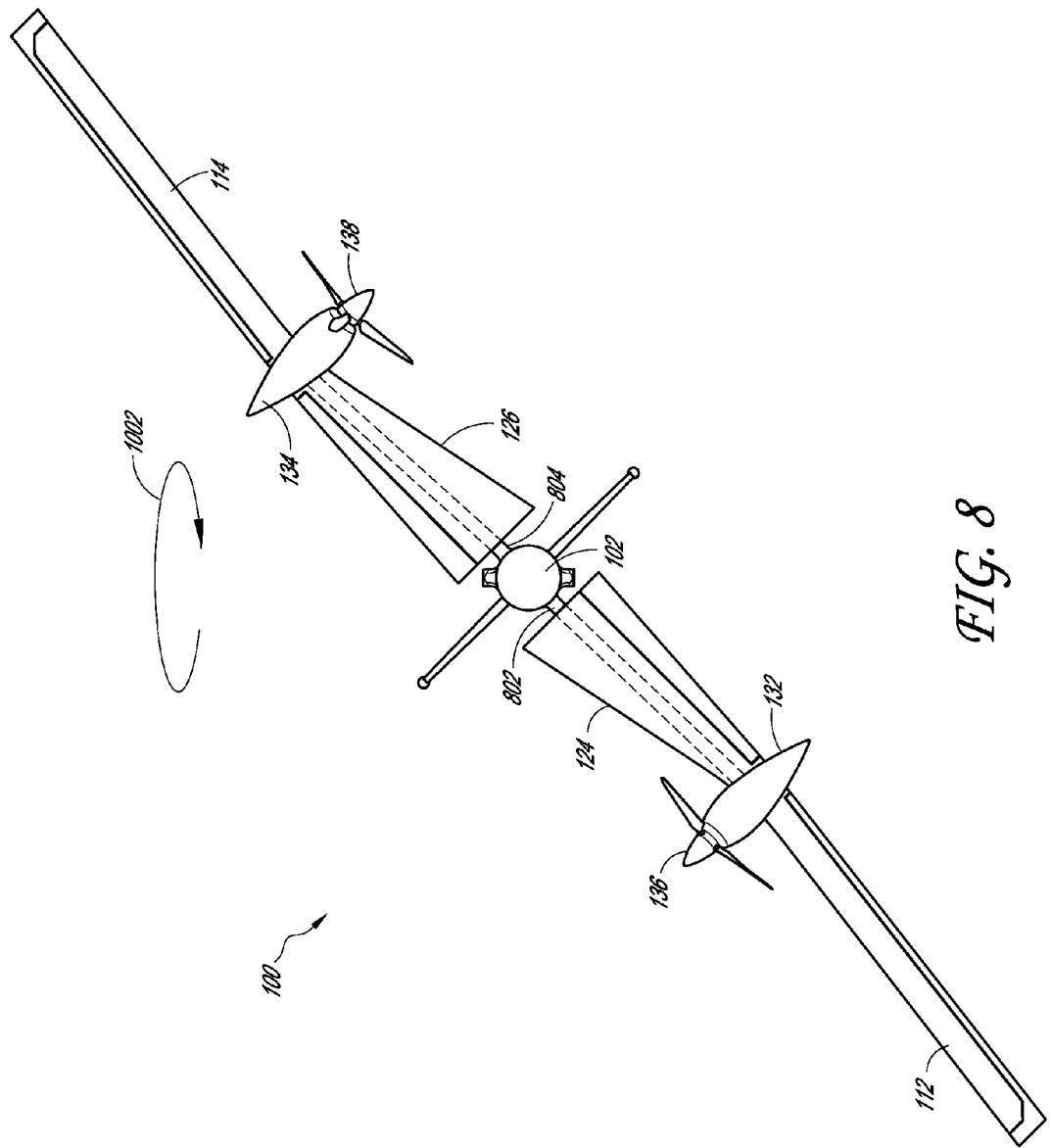
FIG. 8 is a top view of the aircraft of FIG. 1, shown in rotor flight mode.

FIG. 8 is an overhead view of one embodiment of the aircraft 100 when it is in a rotor flight mode configuration. As discussed with respect to FIGS. 5-7 and as more clearly demonstrated here, each wing 112, 114 desirably may be rotated in opposite directions about their length or span-wise axis. In this configuration, the engines 132, 134 attached to each wing 112, 114 may face in substantially opposite directions. As may be more clearly seen in FIG. 8, each wing 112, 114 may comprise a spar 802, 804 that runs lengthwise through the wing from the point of attachment with the fuselage 102 to at least the point of attachment of engine 132, 134 with wing 112, 114. Each spar 802, 804 provides structural rigidity for each wing 112, 114, as may be appreciated by those skilled in the art.

In a preferred embodiment, the spar 802, 804 of each wing is attached to rotating support 502. As more clearly seen in FIG. 5, the wing attachment region 108 is a section of the fuselage 102 that comprises a rotating support 502. A rotating section, comprised of rotating support 502 and wings 112, 114 with engines 132, 134 attached to the rotating section, is allowed to rotate with respect to a longitudinal axis of the fuselage 102. The spars 802, 804 are preferably attached to the rotating support 502 such that each wing 112, 114 is allowed to rotate about the axis defined by the spar 802, 804 such that the leading edge of one wing 124 and the leading edge of the other wing 126 face in substantially opposite directions, as shown in one embodiment in FIG. 8. The rotation of the wings 112, 114 about their spars 802, 804 will also result in the engines 132, 134 attached to each wing to face in substantially opposite directions. Power generated by the engines 132, 134 will turn the propellers 136, 138 which will produce thrust causing the rotation of the wings 112, 114 about a longitudinal axis of the fuselage 102 in the direction indicated 1002 in FIG. 8. This rotation will cause the wings 112, 114 to act as the rotor blades such as those of a helicopter, producing lift and desirably enabling the aircraft 100 to fly and hover in a substantially vertical orientation.

Figure 9:
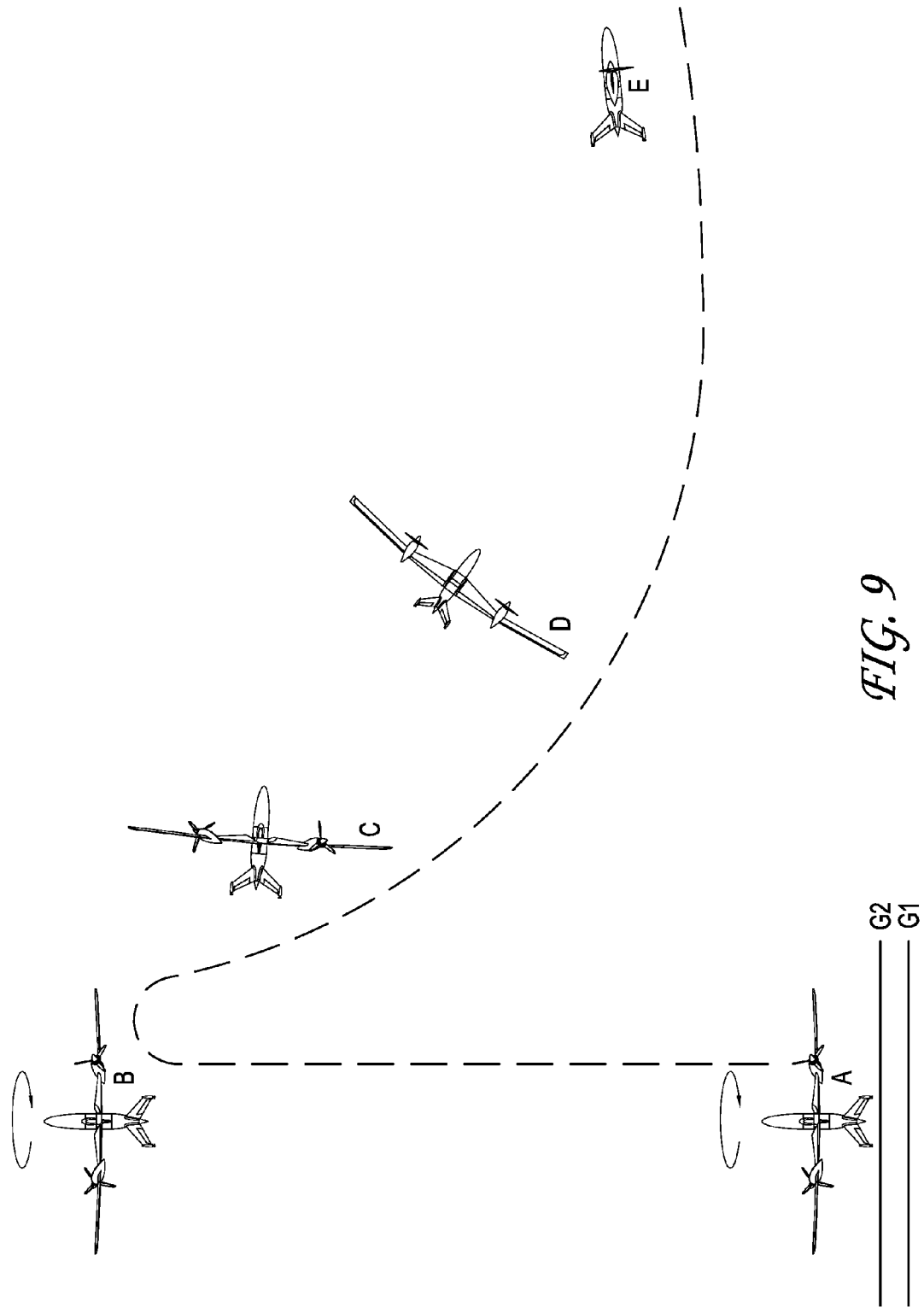
FIG. 9 is a graphical and pictorial representation of a preferred method of converting an aircraft between a rotor flight mode and configuration to a fixed wing flight mode and configuration.

As has been discussed with respect to FIGS. 1-8, aircraft 100 preferably transitions from a VTOL or rotor flight mode to a fixed wing flight mode for flight similar to that of a conventional airplane. A preferred transition to fixed wing flight is shown in FIG. 9. At initiation position A, the aircraft is shown with the engines and propellers oriented in opposite directions as shown in FIGS. 5-8. The aircraft may be on the ground G1 awaiting take off or may be hovering or flying in rotor flight mode above the ground G2. Between positions A and B, the aircraft preferably climbs to approximately 500 ft above ground level. At both positions A and B, the wings are rotating about the fuselage of the aircraft and acting as a rotor to provide thrust for rotor flight. At throttle down position B, the aircraft is preferably throttled down from a climb to hover while in rotor flight mode. Between throttle down position B and pitch-over position C, the aircraft preferably begins a pitch-over maneuver which transitions the attitude of the aircraft from a vertical orientation to a fixed wing orientation. During the pitch-over maneuver depicted between positions B and C, the wings of the aircraft are preferably rotated to a fixed wing flight position in which the engines face in substantially the same direction, this direction being the desired direction of travel for flight as a fixed wing or conventional airplane. For example, the transition of the wings from the rotor flight mode to the fixed wing flight mode may occur within 1 to 15 seconds, but in other embodiments the transition desirably may occur within 1 to 10 seconds or more desirably within 2 to 7 seconds. In some embodiments, the transition time is no more than 7 seconds or more desirably no more than 5 seconds. The transition is accomplished preferably while simultaneously reducing engine throttle. The reduction in throttle desirably reduces rotor speed (the rotation of the wings acting as a rotor) substantially to zero, which occurs between mid-transition position D and fixed wing flight mode position E. At fixed wing flight mode position E, the aircraft has fully transitioned from a rotor flight mode to a fixed wing flight mode, meaning that the wings are no longer rotating around a longitudinal axis of the fuselage but are substantially parallel to a centerline of the fuselage. The wings may be locked with respect to the fuselage to prevent rotation but this is not required. Additionally, the engines preferably face substantially in the direction of travel. At fixed wing flight mode position E, engine throttle is preferably advanced, which accelerates the aircraft allowing for traditional fixed wing flight. Once sufficient airspeed is developed, the aircraft is flying "on-the-wing" similar to that of a conventional airplane and may be controlled with conventional tail surfaces.

Figure 10:
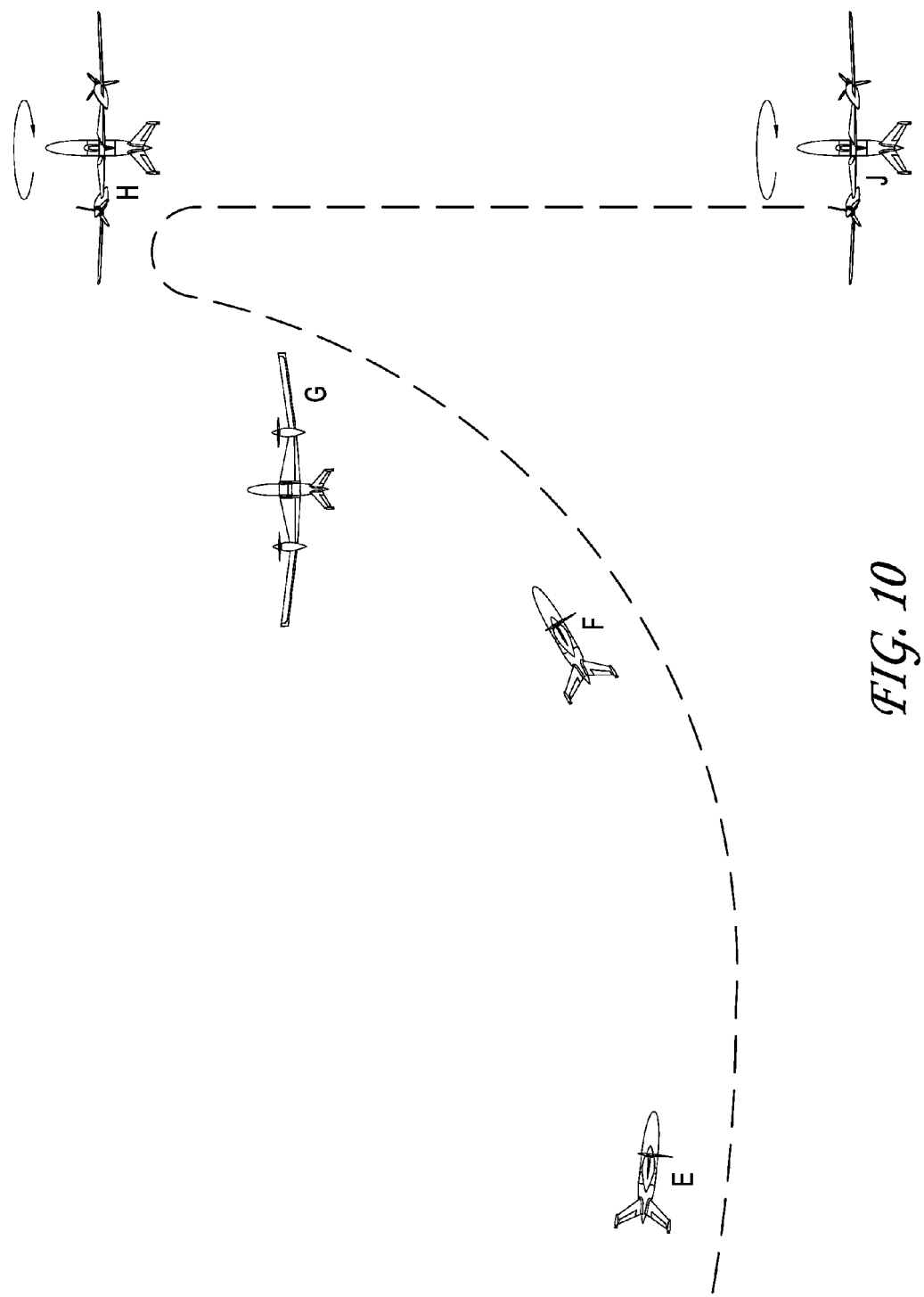
FIG. 10 is a graphical and pictorial representation of a preferred method of converting an aircraft between a fixed wing flight mode and configuration and a rotor flight mode and configuration.

FIG. 10 depicts a preferred method of transitioning from fixed wing flight to rotor flight. At fixed wing flight mode position E, the aircraft is oriented for flight in fixed wing mode, as described with respect the same flight mode and position in FIG. 9. Between fixed wing flight mode position E and pitch-over position F, the aircraft desirably is pitched over to accelerate the aircraft to greater than double the stall speed of the wings with the engines preferably at maximum throttle. Between positions F and G, the aircraft then preferably executes a pull-up maneuver to orient the aircraft for vertical flight with the nose pointed vertically. This maneuver may generate forces that act on the aircraft approximately between 2 and 4 times the gravitational force. At throttle reduction position G, the airspeed of the aircraft is reduced by throttling down the engines. Preferably between throttle reduction position G and rotor wing flight mode position H, the aircraft's configuration is changed from that required for fixed wing flight to that required for rotor flight. This configuration change preferably may occur within 1 to 15 seconds, but in other embodiments the configuration change desirably may occur within 1 to 10 seconds or more desirably within 2 to 7 seconds, during which time the wings rotate in opposite directions such that the engines and propellers face in opposite directions as illustrated above in FIGS. 5-8. In some embodiments, the time to change configurations is no more than 7 seconds or more desirably no more than 5 seconds. At rotor wing flight mode position H, the wings begin to spin around a longitudinal axis of the fuselage like the rotor of a helicopter due to the torque generated by the engines attached to the wings which now face in opposite directions. The rotor speed at rotor wing flight mode position H is preferably increased beyond the speed required for hover flight. Finally, between rotor wing flight mode position H and fully transitioned position J, the engines may be throttled down for stable descent and landing. However, actual landing of the aircraft at this point may not be required if mission considerations and requirements require the aircraft to maintain hover flight at a specific altitude or to complete other aerial maneuvers while in vertical flight mode.

As mentioned above with regard to FIG. 2, the torque demands of the wings 112, 114 when acting as a rotor are desirably matched to the in-flight demands of the aircraft 100 when flying in fixed wing mode, using the same engines 132, 134 and propellers 136, 138. The engines 132, 134 are desirably positioned at a point on the wings 112, 114 where these requirements are substantially equalized. As discussed above, these requirements may have a difference between them of between 0% and 50%, desirably between 0% and 25%, or more desirably between 0% and 10%. In some embodiments, the difference between these requirements is desirably no more than 25% or more desirably no more than 10%. The following discussion describes a preferred method to calculate the position on wings 112, 114 where the engines 132, 134 are attached to substantially equalize these requirements. The exact values used in the calculation are for example purposes and are not intended to limit the calculation or the invention in any way.

The table below provides a list of abbreviations used in the example calculations that follow:

| | |
|---|---|
| VTOL | Vertical Takeoff and Landing |
| SHP | Shaft horsepower (hp) |
| PROP_Efficiency | Propulsive Power/Input Power = Thrust * Vtrue/SHP at a given flight condition |
| GW | Gross Weight (lbs) |
| ROC | Rate of Climb (feet per minute of fpm) |
| Ceiling | Maximum operating altitude of the airplane, typically defined as max power ROC = 100 fpm |
| V and Vtrue | True airspeed (feet per second or fps) |
| V@prop | True airspeed at propeller station in vertical flight mode (fps) |
| VCruise | True airspeed of aircraft in fixed wing flight mode (fps) |
| ρ | Air density (slugs/ft 3) |
| RPM | Revolutions per minute (1/min) |
| L/D | Fixed wing flight lift to drag ratio |
| AR | Wing aspect ratio (wingspan²/wing area) |
| CT | Thrust Coefficient, defined as $CT = \dfrac{Thrust}{\rho * \left(\dfrac{RPM}{60}\right)^2 * Diameter^4}$ |
| Engine % Semispan | Location of engine on semispan of wing, expressed as a percentage |

It has been well established in the art that VTOL power required follows this relation:

$$VTOL\_SHP_{reqd} \cong \frac{RotorLift_{reqd}^{1.5}}{\left[21 * RotorDiameter * \sqrt{\dfrac{\pi}{4}}\right]}$$

Where $VTOL\_SHP_{reqd}$ is the Shaft horsepower required for vertical take off and landing.

Assuming that the aircraft requires 20% excess lift capability in the rotor the equation for $VTOL\_SHP_{reqd}$ becomes:

$$VTOL\_SHP_{reqd} \cong \frac{(1.2 * GW)^{1.5}}{\left[21 * RotorDiameter * \sqrt{\dfrac{\pi}{4}}\right]}$$

For an airplane the SHPreqd is set by the climb or takeoff requirement of the airplane. Since takeoff is not required when the aircraft is in fixed wing flight mode, climb is the key consideration. Initial climb rate at takeoff altitude is a good surrogate for the ceiling capability of an airplane. The greater the ROC, or rate of climb, of an aircraft is at low altitude, the higher the ceiling, or the maximum altitude the aircraft may achieve. For many VTOL vehicles a typical ceiling is 15,000 ft. This ceiling is approximately equivalent to a sea level ROC of 1,500 fpm (or feet per minute) for a long range or high endurance airplane. Using the classical climb equation we can solve for the SHP required when the aircraft is climbing in fixed wing flight mode.

$$CLIMB\_SHP_{reqd} = \frac{VCruise * GW}{PROP\_Efficiency * 550} * \left[\frac{\left[\dfrac{ROC_{reqd}}{60}\right]}{V} + \left(\dfrac{L}{D}\right)^{-1}\right]$$

If the wings are used as the rotor, as in the preferred embodiments discussed above with respect to FIGS. 1-8, the rotor diameter equals the wing span.

Further, if the flight engines are used to power the rotor, as discussed in the preferred embodiments pictured in FIGS. 5-8, the propeller efficiency must be included in the calculation to determine the engine SHP required for VTOL.

For VTOL, the equation becomes:

$$ENGINE\_SHP_{reqd} \cong \frac{(1.2 * GW)^{1.5}}{\left[PROP\_Efficiency * 21 * RotorDiameter * \sqrt{\dfrac{\pi}{4}}\right]}$$

For flight in fixed wing mode the equation becomes:

$$ENGINE\_SHP_{reqd} = \frac{VCruise * GW}{PROP\_Efficiency * 550} * \left[\frac{\left[\dfrac{ROC_{reqd}}{60}\right]}{V} + \left(\dfrac{L}{D}\right)^{-1}\right]$$

Therefore;

$$\frac{(1.2 * GW)^{1.5}}{\left[PROP\_Efficiency * 21 * RotorDiameter * \sqrt{\dfrac{\pi}{4}}\right]} =$$

$$\frac{VCruise * GW}{PROP\_Efficiency * 550} * \left[\frac{\left[\dfrac{ROC_{reqd}}{60}\right]}{V} + \left(\dfrac{L}{D}\right)^{-1}\right]$$

As an illustrative example only, for a very efficient 5000 lb airplane, assume the following:

| |
|---|
| GW = 5000 lbs |
| PROP_Efficiency = 80% |
| L/D = 20 |
| Vtrue = 300 fps |
| $ROC_{reqd}$ = 1,500 fpm |

Solving for the RotorDiameter or wingspan when the engine power for VTOL equals the engine power for climb will result in a preferably balanced design in which the wings are utilized as the rotor for rotor flight.

$$RotorDiameter = \frac{(1.2*GW)^{1.5}}{\left[PROP\_Efficiency*21*\sqrt{\frac{\pi}{4}}\right]*\left[\frac{VCruise*GW}{PROP\_Efficiency*550}\right]*\left[\frac{ROC_{reqd}}{\frac{60}{VCruise}}+\left(\frac{L}{D}\right)^{-1}\right]}$$

In this example only, RotorDiameter=wingspan=68.7 ft.

The previous calculations matched engine power provided by a propeller for vertical and hovering flight and fixed wing flight climb. However, to eliminate the need for mechanical gearing between the flight modes, the engine is desirably secured laterally on the wing to provide the desired rotor torque at the rotor RPM.

Assuming the aircraft when it is in fixed wing configuration has an aspect ratio (AR) of 20 the RPM and torque required may be determined.

Near an advance ratio of zero (hover) an AR=20 wing has these properties.

RotorThrust Coefficient, CT=0.194

$$Thrust = \left(CT*\rho*\frac{RPM}{60}\right)^2 * RotorDiameter^4$$

$$1.2*GW = \left(CT*\rho*\frac{RPM}{60}\right)^2 * RotorDiameter^4$$

Solving for the rotor rotations per minute results in 46 rpm for the wings when they act as a rotor. Recall:

$$VTOL\_SHP_{reqd} \cong \frac{(1.2*GW)^{1.5}}{\left[21*RotorDiameter*\sqrt{\frac{\pi}{4}}\right]}$$

Thus VTOL SHPreqd=454.7 hp.
Therefore:

$$Torque = \frac{VTOL\_SHP*550}{2*\pi*\frac{RPM}{60}}$$

and Torque=41,623 ft-lbs.

Assuming the thrust of the engines in VTOL or vertical/hovering flight is defined as:

$$Thrust = \frac{PROP\_Efficiency*SHP*550}{V@prop}$$

Where V@prop is the relative wind at the engine station on the rotating wing, given by:

$$V@prop = \left(\frac{RPM}{60}\right)*\pi*Engine\ \%\ Semispan*RotorDiameter$$

Then V@prop=82.7 fps.

For engines secured at 50% semispan the available thrust is:

$$Total\_Thrust\_Avail = \frac{PROP\_Efficiency*SHP*550}{(V@prop)}$$

Solving the equation results in Total Thrust Available=2,425 lbs.

From the Rotor Torque Equation:

$$Torque = TotalThrust_{reqd}*Y$$

Rearranged:

$$TotalThrust_{reqd} = \frac{Torque}{Y}$$

Since the rotor diameter, or total wingspan, is 68.7 ft, as calculated above for this example only, an engine located at 50% semi-span has a lever arm (Y) of 17.16 ft.

Therefore, in this example, the Total Thrust Required is 2,425 lbs, which equals the Total Thrust Available as calculated above.

The equivalence of the Total Thrust Available and the Total Thrust Required illustrates that for this example, a balanced design was achieved without needing a gearbox.

As a further example, a balanced 5,000 lb aircraft such as that described in FIGS. 1-10 desirably has a wingspan of 68.7 ft, with a pair of 228 hp engines rigged 7.5 ft from the centerline. A similar analysis for a 500 lb aircraft with an AR=25, Vcruise=100 fps, Prop_Efficiency=65%, L/D=15, Ythrust/Semispan=40% and ROC=1000 fpm yields a rotor diameter of 37.2 ft, powered by 2 16.3 Hp engines rigged 7.45 ft from centerline. In other embodiments, a balanced aircraft may weigh between 400 lb and 100,000 lb, between 1,000 lb and 50,000 lb, or between 2,500 lb and 10,000 lb. In other embodiments, the wingspan of the aircraft may be between 6 ft and 250 ft, between 20 ft and 150 ft, or between 50 ft and 100 ft. In some embodiments, the weight of the aircraft is less than 20,000 lb, less than 10,000 lb, less than 5,000 lb, less than 3,000 lb, or less than 1,000 lb. In other embodiments, the engines may be rigged between 2 ft and 50 ft from the centerline, between 4 ft and 25 ft from the centerline, or between 6 ft and 15 ft from the centerline. In some embodiments, the wingspan of the aircraft is less than 50 ft, less than 20 ft, or less than 10 ft. However, the present invention is not limited to aircraft of any specific weight or wingspan or engines of a particular power output.

Although this application discloses certain preferred embodiments and examples, it will be understood by those skilled in the art that the present inventions extend beyond the specifically disclosed embodiments to other alternative embodiments and/or uses of the invention and obvious modifications and equivalents thereof. For example, while the preferred embodiment is an unmanned aircraft, the aircraft could be manned with a cockpit desirably located in nose section 102. Further, the various features of these inventions can be used alone, or in combination with other features of these inventions other than as expressly described above. While the disclosed embodiments are primarily directed to an aircraft capable of fixed wing and rotor flight modes, aspects of the invention may also be used in connection with other types of aircraft. Thus, it is intended that the scope of the present inventions herein disclosed should not be limited by the particular disclosed embodiments described above, but should be determined only by a fair reading of the claims that follow.

What is claimed is:

1. An aircraft capable of fixed wing and rotor flight modes wherein a fixed wing flight mode is defined as flight in which aircraft wings are rotationally stationary about a fuselage and a rotor flight mode is defined as flight in which aircraft wings rotate about the fuselage, the aircraft comprising:
   a plurality of wings including a first wing and a second wing, each wing having a spar such that each wing is rotatable about a span-wise axis defined by said spar;
   at least one actuator coupled to the spar of each of the plurality of wings;
   a plurality of engines secured to said wings, including a first engine secured to said first wing at a position between 20% and 75% of semi-span of said first wing and a second engine secured to said second wing at a position between 20% and 75% of semi-span of said second wing;
   the fuselage further comprising a rotating support coupled to said plurality of wings to rotate said wings about a longitudinal axis of the fuselage in a rotor flight mode and to maintain said wings rotationally stationary relative to the longitudinal axis of the fuselage in a fixed wing flight mode; and
   fuel tanks disposed in the wings and operatively coupled to the plurality of engines.

2. The aircraft of claim 1, wherein the plurality of engines are each solely confined to the wings such that the fuselage is free of structure that contributes to generating motive force of any of the plurality of engines.

3. The aircraft of claim 2, wherein said engines exclusively provide motive force to power flight in both fixed wing flight mode and rotor flight mode.

4. The aircraft of claim 1, wherein each wing includes a rear swept portion proximate to the fuselage and a forward swept portion distal to the rear swept portion.

5. The aircraft of claim 4, wherein the first engine is disposed between the rear swept portion and the forward swept portion of the first wing, and the second engine is disposed between the rear swept portion and the forward swept portion of the second wing.

6. The aircraft of claim 1, further comprising a plurality of tail stabilizing surfaces.

7. The aircraft of claim 6, wherein said plurality of tail stabilizing surfaces further comprise at least one control surface for controlling the orientation of the aircraft when the aircraft is flying in fixed wing mode or in rotor flight mode.

8. The aircraft of claim 1, wherein each of the plurality of engines are secured to a corresponding wing of the plurality of wings at a prescribed semi-span distance that is disposed at or between a first calculated location and a second calculated location, in which
   (a) the first calculated location is a location along the semi-span calculated to optimize rotor flight mode for the corresponding wing and propulsive power of the corresponding engine,
   (b) the second calculated location is a location along the semi-span calculated to optimize fixed wing flight mode for the corresponding wing and propulsive power of the corresponding engine, and
   (c) the first calculated location and the second calculated location are no more than 25% apart along of the semi-span distance.

9. An aircraft capable of fixed wing and rotor flight modes, comprising:
   a fuselage main body defining a longitudinal axis, the fuselage main body having a nose section, tail section, and wing attachment section disposed between the nose section and the tail section;
   a plurality of dual-purpose wings, including a first wing and a second wing, rotatably mounted to said wing attachment section of fuselage for a fixed wing flight mode and for a rotor flight mode, in which the fixed wing flight mode is defined as flight in which said wings are maintained rotationally stationary relative to the longitudinal axis and the rotor flight mode is defined as flight in which said wings rotate about the longitudinal axis, each wing having an actuated spar coupled to said wing attachment section such that each wing is rotatable about a span-wise axis defined by said spar;
   a plurality of engines, including a first engine secured to said first wing at a position spaced proximally from a wing tip of said first wing and a second engine a position spaced proximally from a wing tip of said second wing, the plurality of engines are each solely confined to the wings such that the fuselage is free of structure that contributes to generating motive force of any of the plurality of engines; and
   fuel tanks disposed in the wings and operatively coupled to the plurality of engines.

10. The aircraft of claim 9, wherein each of the plurality of engines are secured to a corresponding wing of the plurality of wings at a prescribed semi-span distance that is disposed at or between a first calculated location and a second calculated location, in which
    (a) the first calculated location is a location along the semi-span calculated to optimize rotor flight mode for the corresponding wing and propulsive power of the corresponding engine,
    (b) the second calculated location is a location along the semi-span calculated to optimize fixed wing flight mode for the corresponding wing and propulsive power of the corresponding engine, and
    (c) the first calculated location and the second calculated location are no more than 25% apart along of the semi-span distance.

11. The aircraft of claim 9, wherein each wing includes a rear swept portion proximate to the fuselage and a forward swept portion distal to the rear swept portion.

12. The aircraft of claim 11, wherein the first engine is disposed between the rear swept portion and the forward swept portion of the first wing, and the second engine is disposed between the rear swept portion and the forward swept portion of the second wing.

13. The aircraft of claim 9, further comprising a plurality of tail stabilizing surfaces.

14. The aircraft of claim 13, wherein said plurality of tail stabilizing surfaces further comprise at least one control surface for controlling the orientation of the aircraft when the aircraft is flying in fixed wing mode or in rotor flight mode.

15. An aircraft capable of fixed wing and rotor flight modes, comprising:
    a fuselage main body defining a longitudinal axis, the fuselage main body having a nose section, tail section, and wing attachment section disposed between the nose section and the tail section;
    a plurality of dual-purpose wings, including a first wing and a second wing, rotatably mounted to said wing attachment section of fuselage for a fixed wing flight mode and for a rotor flight mode, in which the fixed wing flight mode is defined as flight in which said wings are maintained rotationally stationary relative to the longitudinal axis and the rotor flight mode is defined as flight in which said wings rotate about the longitudinal axis, each wing having an actuated spar coupled to said wing attachment section such that each wing is rotatable about a span-wise axis defined by said spar;

a plurality of engines, wherein each of the plurality of engines are secured to a corresponding wing of the plurality of wings at a prescribed semi-span distance that is disposed at or between a first calculated location and a second calculated location, in which
  (a) the first calculated location is a location along the semi-span calculated to optimize rotor flight mode for the corresponding wing and propulsive power of the corresponding engine,
  (b) the second calculated location is a location along the semi-span calculated to optimize fixed wing flight mode for the corresponding wing and propulsive power of the corresponding engine, and
  (c) the first calculated location and the second calculated location are no more than 25% apart along of the semi-span distance; and fuel tanks disposed in the wings and operatively coupled to the plurality of engines.

16. The aircraft of claim 15, wherein the plurality of engines are each solely confined to the wings such that the fuselage is free of structure that contributes to generating motive force of any of the plurality of engines.

17. The aircraft of claim 16, wherein said engines exclusively provide motive force to power flight in both fixed wing flight mode and rotor flight mode.

18. The aircraft of claim 15, wherein each wing includes a rear swept portion proximate to the fuselage and a forward swept portion distal to the rear swept portion.

19. The aircraft of claim 18, wherein the first engine is disposed between the rear swept portion and the forward swept portion of the first wing, and the second engine is disposed between the rear swept portion and the forward swept portion of the second wing.

20. The aircraft of claim 15, further comprising a plurality of tail stabilizing surfaces.

21. The aircraft of claim 20, wherein said plurality of tail stabilizing surfaces further comprise at least one control surface for controlling the orientation of the aircraft when the aircraft is flying in fixed wing mode or in rotor flight mode.

22. The aircraft of claim 15, wherein the wings are symmetric airfoils.

23. The aircraft of claim 15, wherein said engines may be jet engines or propeller engines.

* * * * *